United States Patent [19]

Hammer

[11] 3,995,192
[45] Nov. 30, 1976

[54] REPROGRAPHIC FLUORESCENT LAMP WITH IMPROVED REFLECTOR LAYER

[75] Inventor: Edward E. Hammer, Mayfield Village, Ohio

[73] Assignee: General Electric Company, Schenectady, N.Y.

[22] Filed: Dec. 5, 1975

[21] Appl. No.: 638,188

[52] U.S. Cl. .............................. 313/488; 313/113; 313/486; 313/489
[51] Int. Cl.² .......................................... N01J 1/62
[58] Field of Search ........... 313/113, 221, 486, 488, 313/489

[56] References Cited
UNITED STATES PATENTS

| | | | |
|---|---|---|---|
| 3,141,990 | 7/1964 | Ray | 313/486 |
| 3,379,917 | 4/1968 | Menelly | 313/221 |
| 3,875,455 | 4/1975 | Kaduk | 313/489 |
| 3,886,396 | 5/1975 | Hammer | 313/489 |

*Primary Examiner*—R. V. Rolinec
*Assistant Examiner*—Michael J. Tokar
*Attorney, Agent, or Firm*—John F. McDevitt; Lawrence R. Kempton; Frank L. Neuhauser

[57] ABSTRACT

An improved reflector layer is provided utilizing a titanium dioxide ($TiO_2$) admixture containing up to approximately 15 percent by weight alumina ($Al_2O_3$) or zirconia ($ZrO_2$). Said reflector layer underlies the phosphor layer, and an aluminum oxide ($Al_2O_3$) layer can be deposited upon the phosphor layer.

6 Claims, 1 Drawing Figure

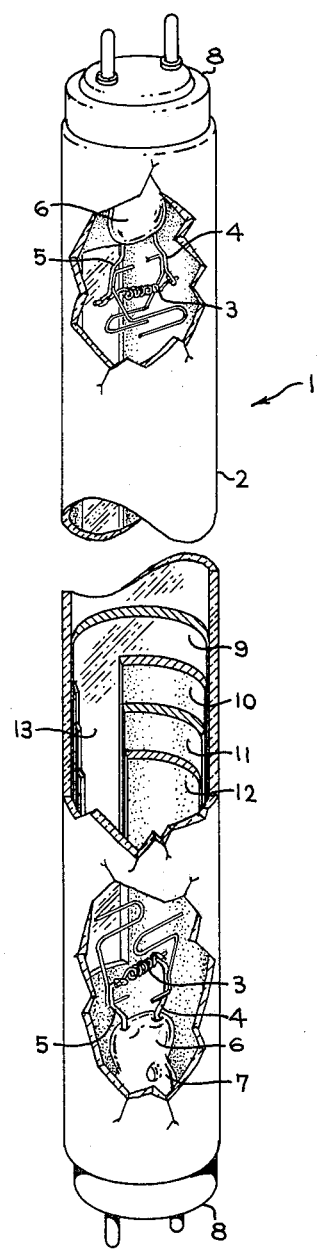

REPROGRAPHIC FLUORESCENT LAMP WITH IMPROVED REFLECTOR LAYER

CROSS-REFERENCE TO RELATED APPLICATION

A related reflector layer is described in U.S. patent application Ser. No. 638,189, for Edward E. Hammer and Edward E. Kaduk, entitled "Reprographic Fluorescent Lamp Having Improved Reflector Layer," assigned to the present assignee and filed concurrently with the present application.

BACKGROUND OF THE INVENTION

The invention is in the general field of fluorescent lamps, particularly aperture-type fluorescent reprographic lamps used in copying documents and having a reflective coating of titanium dioxide disposed between the inner bulb wall and a phosphor layer for reflecting light outwardly through the aperture in addition to the light being emitted through the aperture directly from the phosphor layer. In one type of such aperture lamp, the aperture is in the form on an elongated region along at least a portion of the bulb length and is free from both phosphor and reflecting material and in another type the aperture is free from reflecting material but is covered with the phosphor. Such lamps are described in U.S. Pat. No. 3,875,455 which further describes the various different materials that can be used for the light reflector coating and for the phosphor composition. In more recently issued U.S. Pat. No. 3,886,396 it is disclosed that the reflected coating may consist entirely of magnesium oxide (MgO) and that a protective post-coating of finely divided aluminum oxide ($Al_2O_3$) particles deposited directly upon the phosphor layer improves lamp maintenance as well as reduces end discoloration during lamp operation.

Because of the decrease in light output which still occurs during lifetime of a reprographic lamp, there still remains a significant need for additional improvement. It would also be desirable to obtain improved lamp maintenance by simple modification of the reflector layer itself as distinct from any requirement for additional layers within the lamp envelope or accompanying modification of the phosphor layer from that presently used.

SUMMARY OF THE INVENTION

It has now been discovered, surprisingly, that a reflector layer which employs an admixture of $TiO_2$ with an additive oxide compound selected from $Al_2O_3$ and $ZrO_2$ in particular proportions provides higher light output and better lamp maintenance than is obtained with $TiO_2$ alone. The reason for such combined improvement is not fully understood at present and as can be noted from experimental results hereinafter provided upon particular embodiments of the present admixtures, it further appears that the amount of brightness improvement may further depend upon the phosphor composition being employed in the lamps.

Briefly, the present reflector layer comprises a $TiO_2$ admixture containing from a small but effective amount up to approximately 15 percent by weight $Al_2O_3$ or $ZrO_2$. Said admixture can be prepared in conventional fashion for coating of the inner bulb wall as a suspension in a solution of ethyl cellulose or some other suitable binder in an organic solvent. Thereafter the bulb can be lehred in order to volatilize the solvent and organic binder whereupon a solid adherent coating of said admixture is produced on the bulb wall. The phosphor layer can be directly deposited upon said reflector coating also in conventional fashion from a liquid suspension for subsequent lehring to provide the final composite coating. There remains only need to form the aperture window by conventional removal of some coating material.

In a preferred embodiment, an aluminum oxide postcoat is deposited directly upon a green zinc silicate phosphor layer as described in the aforementioned U.S. Pat. no. 3,886,396 to provide a three-layer coating which resists drop-off in light output during the life of the lamp. An especially preferred modification of said embodiment protects the inner glass surface of the lamp envelope with a thin clear film of titanium dioxide as disclosed in both aforementioned U.S. Pat. Nos. 3,875,455 and 3,886,396. To form this initial base coat layer, an organometallic compound of titanium such as tetrabutyl titanate or tetraiosopropyl titanate dissolved in an appropriate solvent such as butyl alcohol or butyl acetate, is applied to the glass. The solvent evaporates almost upon application, and the titanate is left deposited upon the inner surface of the glass bulb. Moisture from the air hydrolyzes the titanate almost as fast as the solvent evaporates forming titanium dioxide which remains as a very thin clear continuous protective film in a thickness from about 0.002 to 0.02 microns.

DESCRIPTION OF THE DRAWING

The accompanying drawing depicts an aperture fluorescent lamp in accordance with the present invention.

DESCRIPTION OF THE PREFERRED EMBODIMENT

Referring to the accompanying FIGURE, there is shown a fluorescent lamp 1 comprising an elongated sode lime silica glass tube or bulb 2 of circular cross section. It has the usual electrode 3 at each end supported on in-lead wires 4, 5 which extends through a glass press 6 in a mount stem 7 to the contacts of a base 8 affixed to the end of the lamp. The sealed tube is filled with an inert gas such as argon or a mixture of argon and neon at a lower pressure; for example, 2 torr, and a small quantity of mercury is added, at least enough to provide a low vapor pressure of about 6 microns during operation. The inner surface of the glass tube is first protectively coated with a thin liquid film of an organometallic compound of titanium which is deposited completely around the inner bulb circumference and thereafter lehred to produce a clear $TiO_2$ coating 9 that is bonded tightly to the glass surface. A reflector coating 10 is deposited thereon and a coextensive phosphor coating deposited upon said reflector coating with both coatings extending around the major portion of the glass tubes circumferential surface as shown. This leaves a narrow uncoated strip or aperture 13 extending lengthwise of the lamp. Alternately, the coatings 10 and 11 may be applied at first over the entire glass tube internal surface and then scraped or brushed off to form the aperture 13 in a desired width; for instance, over a 45 portion of the circumference of the tube. A post-coating 12 of finely divided alumina is then deposited as the topmost layer with said post-coat preferably extending over the clear aperture 13 in order to provide maximum protection of the underlying layers. In accordance with the present invention, the improved reflector layer 10 comprises a $TiO_2$ admixture containing from an effective amount up to approximately 15 percent by weight $Al_2O_3$ or $ZrO_2$ and which can be prepared directly by introducing finely divided solid particulates of the additive oxide compound into an otherwise conventional $TiO_2$ coating suspension. Suitable preparation of a $TiO_2$ coating suspension is described in the aforementioned U.S. Pat. No. 3,875,455 patent which utilizes a $TiO_2$ particle size less than 1 micron diameter with an average particle size of approximately 0.3 microns. The $Al_2O_3$ or $ZrO_2$ additive can have the same particle size or less, and both materials are available commercially at this particle size.

The phosphor material in layer 11 which is desirably protected with an alumina post-coating 12 is green zinc orthosilicate ($Zn_2SiO_4$) which can be applied from a suspension in a solution of nitrocellulose in butyl acetate, all in known manner. The preferred zinc orthosilicate phosphor also contains approximately 0.4 percent by weight $Sb_2O_3$. Examples of other phosphor materials which can be improved in accordance with the present invention include magnesium aluminum gallate or cool white halophosphate and still other phosphors are contemplated. Deposition of a suitable alumina post-coating 12 is also described in the aforementioned U.S. Pat. No. 3,886,396 patent along with a peferred method for preparing such coating suspension.

The improved performance of reprographic lamps made in accordance with the present invention is shown in the following table which illustrates relative aperture brightness at various burning hours of lamp operation. These tests were conducted upon 18 inches-long T8-type aperture lamps utilizing various phosphor coatings to evaluate the improvement in aperture brightness attributable to the present reflector layer. Reported aperture brightness measurements in said table provides a comparison between $TiO_2$ reflector layer containing no additives when compared with $TiO_2$ admixtures containing various amounts of $Al_2O_3$ or $ZrO_2$. In said Table 1 below, it can be noted that a 0.14 percent by weight $Al_2O_3$ addition in the $TiO_2$ reflecting layer produces higher initial aperture brightness when employed with both green zinc silicate and green magnesium gallate phosphor coatings as well as improved lamp maintenance after the lamps have been burned for 300 hours. As distinct therefrom, the same $Al_2O_3$ addition when used with cool white halophosphate phosphor produced higher initial brightness but no improved lamp maintenance during the same period of operation. A 0.17 percent by weight $ZrO_2$ addition provided greater initial brightness and maintenance when utilized with green zinc silicate and green magnesium gallate phosphors but only improved maintenance for the cool halophosphate phosphor embodiment.

Table 1

| Phosphor | Reflector Layer | Light Output (Arbitrary Units) 2 Hrs. | 300 Hrs. |
|---|---|---|---|
| Green $Zn_2SiO_4$ | $TiO_2$ | 133.7 | 86.3 |
| | $TiO_2$ with 0.14% $Al_2O_3$ | 135.3 | 88.1 |
| | $TiO_2$ with 0.17% $ZrO_2$ | 136.5 | 99.6 |
| Green Mg-Al Gallate | $TiO_2$ | 82.0 | 69.2 |
| | $TiO_2$ with 0.14% $Al_2O_3$ | 82.0 | 74.4 |
| | $TiO_2$ with 0.17% $ZrO_2$ | 79.7 | 71.4 |
| Cool White Halophosphate | $TiO_2$ | 101.3 | 91.4 |
| | $TiO_2$ with 0.14% $Al_2O_3$ | 101.5 | 90.4 |
| | $TiO_2$ with 0.17% $ZrO_2$ | 101.0 | 92.9 |

It will be apparent from the above description that various modifications of the illustrated embodiments can be carried out without departing from the true spirit and scope of the present invention. For example, still other additives may be incorporated in the present admixtures as a further means of providing increased lamp brightness and maintenance. It is intended to limit the present invention, therefore, only by the scope of the following claims.

What I claim as new and desire to secure by Letters Patent of the United States is:

1. An aperture fluorescent reprographic lamp comprising an elongated envelope containing an ionizable medium including mercury vapor and having electrodes at the respective ends thereof, and a phosphor layer deposited upon a reflector layer within said envelope, the improvement wherein said reflector layer comprises a $TiO_2$ admixture containing from a small but effective amount up to approximately 15 percent by weight of an additive oxide compound selected from $Al_2O_3$ and $ZrO_2$.

2. A lamp as in claim 1 wherein the phosphor composition is a green zinc silicate phosphor.

3. A lamp as in claim 2 wherein the phosphor composition is a green zinc silicate phosphor admixture containing up to approximately 0.4 percent by weight $Sb_2O_3$.

4. A lamp as in claim 1 wherein the phosphor composition is a green magnesium gallate phosphor.

5. A lamp as in claim 1 wherein the phosphor compostion is a cool white halophosphate phosphor.

6. A lamp as in claim 1 which further includes an aluminum oxide layer deposited upon the phosphor layer.

* * * * *